Patented Mar. 8, 1949

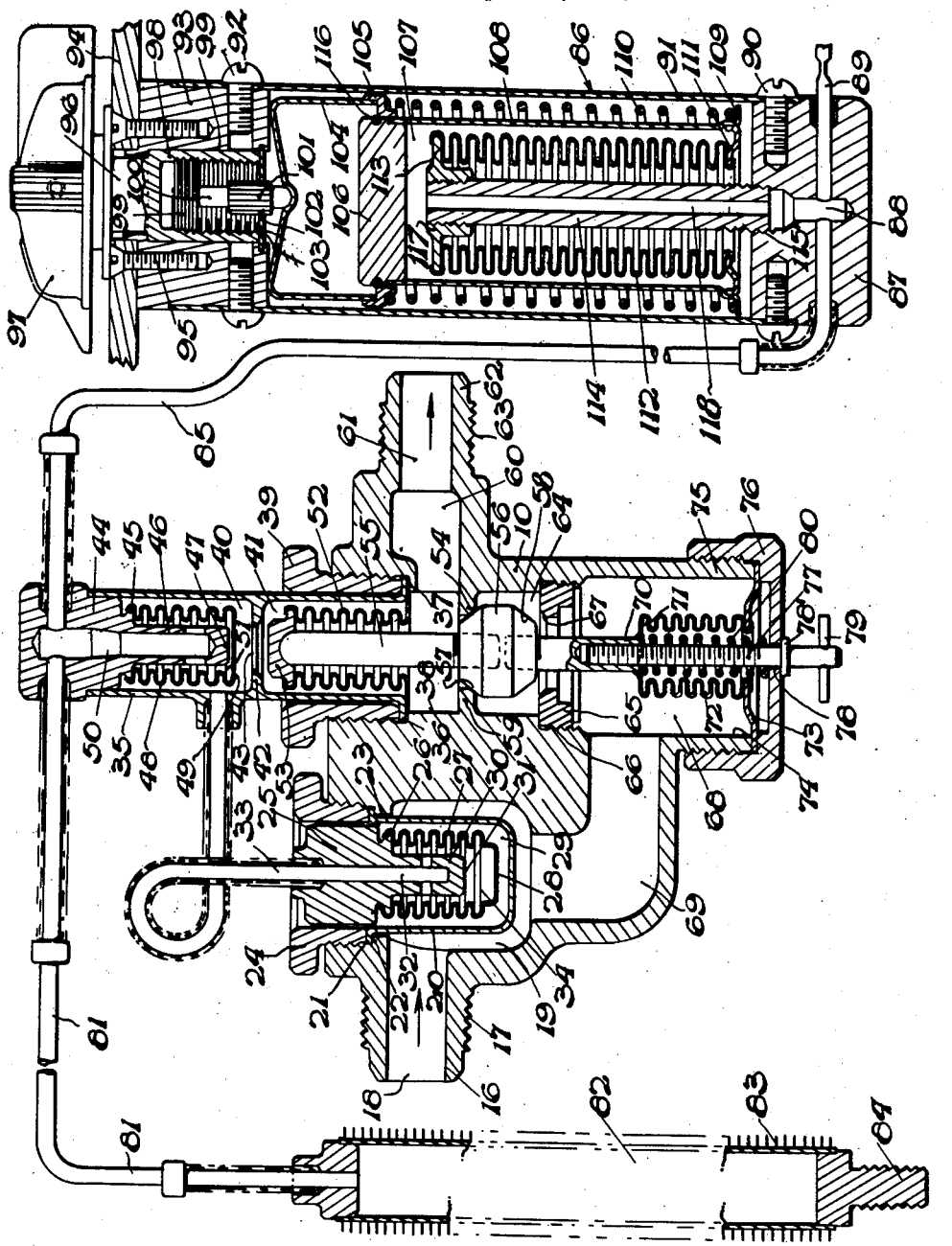

2,463,599

UNITED STATES PATENT OFFICE 2,463,599

TEMPERATURE REGULATOR

Charles D. Branson, Knoxville, Tenn., assignor to Robertshaw-Fulton Controls Company, a corporation of Delaware Application April 4, 1947, Serial No. 739,506

12 Claims. (Cl. 236—1)

This invention relates to temperature regulators, and more particularly to a temperature regulator adapted to control automatically the flow of either a heating or a cooling fluid for use with systems wherein the same heat interchange device or devices are used whether a heating medium is circulated into heat interchanging relationship therewith during cold weather or a cooling medium is circulated into heat interchanging relationship therewith during warm weather.

If a single thermostatically operated valve is to control the flow of either a heating fluid or a cooling fluid to maintain a desired temperature condition or range, the operation in response to the thermostat must be reversed depending upon whether a heating fluid or a cooling fluid is being controlled, i. e., if the valve is operating to control a heating fluid, an increase in temperature above the temperature to be maintained requires that the valve be moved toward closed position to decrease the quantity of heating fluid being admitted to the heat interchanger, whereas if the valve is controlling a cooling fluid, an increase in temperature above that which is to be maintained requires a movement of the valve toward open position to increase the amount of cooling fluid flowing to the heat interchanger.

It is an object of this invention to provide an improved temperature regulator of the type characterized wherein a single valve mechanism is automatically conditioned to control the flow of heating or cooling fluid and then thermostatically controlled to automatically regulate the flow of fluid for which the mechanism is conditioned.

Another object of this invention is to provide an improved temperature regulator of the type characterized which is accurately responsive both to the medium to be controlled and to the temperature to be regulated.

Another object of this invention is to provide an improved temperature regulator of the type characterized which is accurately balanced against variations in pressure of the medium to be controlled.

Another object of this invention is to provide an improved temperature regulator of the type characterized which may be readily and accurately preadjusted to predetermine the temperature condition or range of temperatures to be maintained.

Another object of this invention is to provide an improved temperature regulator of the type characterized which is composed of parts that may be economically fabricated and assembled and which is certain, efficient and durable in operation.

Further objects will appear as the description of the invention proceeds.

The invention is capable of receiving a variety of mechanical expressions only one of which is shown on the accompanying drawing, and it is therefore to be expressly understood that the drawing is for purposes of illustration only and is not to be construed as a definition of the limits of the invention, reference being had to the appended claims for that purpose.

The accompanying drawing shows somewhat diagrammatically one embodiment of the present invention.

In the form shown the main part of the regulator is housed in a casing 10, which may be of any suitable size, construction and material, here shown as formed in one piece.

Housing 10 is provided with a nipple 16 shown as threaded at 17 for attachment into any suitable line for conveying to the regulator at different times the heating medium and the cooling medium to be controlled. Nipple 16 is provided with an inlet passage 18 communicating with a chamber 19 within said housing 10. Disposed in said chamber 19 is a thermostat subjected to the medium to be controlled. As shown, said thermostat includes a cup-shaped exterior wall 20 provided with a flange 21 by means of which it is clamped on a seat 22 surrounding an opening 23 provided in the housing 10, the clamping means being shown as an annular, exteriorly threaded thimble member 24. Suitably secured in the open end of said cup-shaped member 20, as by brazing or soldering, to form a hermetic seal is a block 25 having an interior flange 26. Hermetically sealed to said flange 26 is an expansible and collapsible corrugated tubular wall or bellows 27 having a movable end 28. Cup-shaped wall 20 and bellows 27 thereby form a thermostatic chamber 29 which is charged with any suitable thermostatic fluid, preferably a vaporizable liquid as well understood in the art.

Block 25 has formed thereon or suitably attached thereto an inwardly directed post 30 having an inner stop face 31 and a suitable passage or passages 32 communicating with the chamber 34 within said bellows 27 and leading outwardly through the block 25 to any suitable pipe or conduit 33. At its opposite extremity pipe or conduit 33 communicates with the interior of a cylindrical member 35 having at its inner extremity a flange 36 by which it may be clamped in position on a seat 37 surrounding a second aperture 38 formed in said housing 10, as by means of an annular, exteriorly threaded thimble member 39.

Tubular member 35 is divided into two chambers by means of an intermediate partition 42 having an opening 43 therethrough. The outer extremity of member 35 is closed by a block 44 hermetically sealed to member 35, said block being provided interiorly with a flange 45 and a post 46 terminating in a stop face 47. Hermetically sealed to the flange 45 is an expansible and collapsible corrugated tubular wall or bellows 48 having a movable end wall 49, bellows 48 and member 35 forming a chamber 40 with which pipe or conduit 33 communicates. Block 44 and post 46 are provided with one or more suitable passages 50 in communication with the chamber 51 interiorly of the bellows 48 for a purpose to be described.

Hermetically secured to or in the inner end of the tubular member 35 is the flanged end of a second expansible and collapsible corrugated tubular wall or bellows 52 having a movable end wall 53 and forming with the inner portion of the tubular member 35 a chamber 41 in communication with chamber 40 through aperture 43. Contacting with the inner face of said movable end wall 53 is the extremity of a valve stem 55 which, at its opposite extremity, is suitably attached, as by threading, to the valve means to be controlled, here shown as formed as a single valve member 56 having opposed seating surfaces 57 and 58, although if preferred a pair of valve members could be used. Seating surface 57 is in alignment with a valve port 54 formed in a partition 59 interiorly of the housing 10. At one side of said partition 59 is a chamber 60 with which communicates the outlet passage 61 formed in a nipple 62 exteriorly threaded at 63 for connection with any suitable line leading to one or more heat exchangers. At the opposite side of said partition 59 is a chamber 64 in which valve member 56 is disposed, said chamber being completed at its side opposite the port 54 by a threaded block 65 threadedly received in an aperture 66 and having a centrally arranged valve port 67 for cooperation with the seating surface 58 on the valve member 56. Seating surfaces 57 and 58 have the same effective area as do also the ports 54 and 67.

Housing 10 is suitably formed interiorly to form a chamber 68 at the opposite side of the valve port 67 from the valve containing chamber 64 and a passage 69 is in communication with said chamber 68 and the chamber 19 hereinabove referred to.

Extending from the valve member 56 oppositely to stem 55 is a second stem 70 having at its end an interiorly threaded opening and to which is attached in any suitable way as by brazing or soldering the movable end wall 71 of an expansible and collapsible corrugated tubular wall or bellows 72 of the same effective area as bellows 52 and whose opposite extremity is hermetically sealed to a plate or flange member 73 which closes an opening 74 in housing 10, said flange member 73 being shown as clamped against the end of an exteriorly threaded collar-like portion 75 surrounding said opening 74 by an interiorly threaded cup-shaped member 76. Threadedly engaged in the interiorly threaded opening in the stem 70 is a threaded spindle 77 which extends through an opening 78 in said cup-shaped member 76 and has exteriorly thereof a collar 78' bearing on the outer face of said cup-shaped member 76. Spindle 77 may be provided with any suitable knob or hand grasp 79 for rotating the same. A coil spring 80 is also preferably interposed between the inner face of said cup-shaped member 76 and the movable end wall 71 of bellows 72, being concentrically disposed within said bellows as illustrated, for a purpose to be explained.

Chamber 51 within bellows 48 constitutes the expansible and collapsible motor vessel of a thermostat subjected to the temperature of the space whose temperature is to be maintained. To this end, the passage or passages in block 44 and post 46 communicate with any suitable pipe or conduit 81, which may be of any suitable length and size, and flexible or rigid as preferred, which at its opposite end is in communication with a bulb 82 of any suitable construction, here shown as provided with exterior heat conducting fins 83 and a threaded stud 84 by which it may be conveniently mounted at any suitable location.

Also in communication with the passage or passages 50 is a second pipe or conduit 85, which may be of any suitable length and size and of rigid or flexible construction as preferred, leading to adjustment and overrun mechanism of any suitable character generally indicated at 86. As here shown, said mechanism comprises a block 87 having interior passages 88 in communication with the pipe or conduit 85, and a filling tube 89 may also communicate with said passages. Secured to said block 87 in any suitable way, as by screws 90, is a tubular housing member 91 which at its opposite end is secured in any suitable way, as by screws 92, to a second block 93 adapted to be mounted in any suitable way on any appropriate wall 94, as by screws 95. Extending through an aperture in said wall 94 is the shank 96 of an adjusting knob 97, shank 96 being secured in any suitable way to an interiorly threaded cup-shaped member 98 mounted for rotation in a centrally arranged recess in the block 93. Cooperating with the interior threads on member 98 is a threaded plug 99 having a stem 100 which, intermediate its length, is provided with longitudinally extending splines 101 that engage suitable serrations in the periphery of an aperture 102 formed in a plate 103 suitably secured in or to the block 93. The splines 101 cooperate with the serrations in aperture 102 to prevent rotational movement of the stem 100 but permit endwise movement of said stem as the plug 99 is moved inwardly or outwardly by rotation of the interiorly threaded cup-shaped member 98 from the knob 97.

The inner extremity of stem 100 is engaged with the end wall of cup-shaped member 104 secured in any suitable way to an annular member 105 providing an annular spring seat. Slidably mounted in said annular member 105 is the end member 106 of a chamber 107 whose outer periphery is formed by a tubular wall 108 hermetically secured at one end in any suitable way to member 106 and at its opposite end exteriorly flanged at 109 to provide a second spring seat. A coil spring 110 reacts between said spring seats 105 and 109. Secured to the tubular wall 108 adjacent the flange 109 is an annular member 111 and hermetically sealed to said member 111 is an expansible and collapsible corrugated tubular wall or bellows 112 which at its opposite end is secured to a flange 113 formed integrally with or formed on a collar 117 threadedly secured to a centrally arranged post 114, here shown as threadedly received in a recess 115 in the block 87 at its opposite extremity. Bellows 112 forms the inner periphery of chamber 107. Post 114 has an interior passage 118 communicating at its opposite extremities with the passages 88 in block 87 and with the chamber 107. End member 106 may move upwardly as viewed in the drawing with respect to the annular member 105, against the tension of the spring 110, compressing the bellows 112, and to limit the extent to which end member 106 may move downwardly as viewed in the drawing under the action of the spring 110, said end member 106 is provided with a suitable stop means for cooperation with the annular member 105, here shown as a ring 116 carried by the end member and engageable with a seat or shoulder on the annular member 105.

Chamber 107, passages 118 and 88, piping 85, passages 50, chamber 51, piping 81 and bulb 82 are charged with a suitable thermostatic fluid preferably a liquid filling said spaces. Chamber 34 interiorly of bellows 27, passage 33 and chambers 40 and 41 exteriorly of the bellows 48 and 52 are also filled with a pressure transmitting liquid.

In operation the bulb 82 is mounted in any suitable way, as by the threaded stud 84, so as to be subjected to the temperature to be controlled, while the source of medium to be controlled is connected to the inlet 18 of the regulator, and the heat interchanging device or devices to be utilized are connected to the outlet 61 of said regulator.

Assuming that the inlet 18 is in communication with a source of heating medium, the heating medium enters chamber 19 through inlet 18 and may flow through the passage 69 to the chamber 68. The heating medium being at an elevated temperature, the vaporizable medium in the chamber 29 will vaporize moving the movable end wall 28 of bellows 27 upwardly as viewed in the drawing. Expansion of chamber 29 causes a contraction of chamber 34 forcing the pressure transmitting medium therein through the passage 33 and into chambers 40 and 41. As chamber 51 is filled with the liquid constituting the charge of the thermostatic system it is not contracted by this pressure transmitting medium, but the pressure is transmitted to the liquid in chamber 41 causing movable end wall 53 to move downwardly as viewed in the drawing, and thereby moving valve member 56 to position its seating surface 58 in cooperative relationship with the port 67. Movable end wall 28 of chamber 34 will contact stop surface 31 on post 30 before the valve member 56 is moved so far as to close port 67 unless such is required by the temperature to which the bulb 82 is subjected. Seating surface 58 is thereby positioned in cooperative relationship with the port 67, which is the proper position for controlling a heating medium, inasmuch as expansion of the motor vessel constituted by chamber 51 under the influence of the temperature at bulb 82 will transmit pressure through the liquid filling the chambers 40 and 41 to the movable end wall 53 engaged with the valve stem, causing the valve member to approach its port 67 and diminish the flow of heating medium, while contraction of said motor vessel will cause the valve member to move away from its port. Therefore, the valve member is properly conditioned for controlling the flow of a heating medium from chamber 68 through port 67, chamber 64, wide open port 54, chamber 60 and outlet 61.

If now a cooling medium is connected with the inlet 18, the cooling medium will flow into chamber 19 and through passage 69 into chamber 68. Said medium being at a reduced temperature the vaporizable liquid in chamber 29 condenses to effect contraction of chamber 29. Thereby chamber 34 is expanded, withdrawing the pressure transmitting liquid through passage 33 from chambers 40 and 41. Liquid will thereby be withdrawn from chamber 41, and spring 80, acting on stem 70, will retain the end of stem 55 in contact with the movable end wall 53 whereby the valve member 56 will move to a position wherein its seating surface 57 is in cooperative relationship with the port 54. However, valve member 56 will not move to close port 54 unless such is required by the temperature at the bulb 82 because movable end wall 28 will contact the end of the cup-shaped wall 20 before the volume of chamber 41 is sufficiently contracted to cause engagement of the seating surface 57 with the port 54. The valve mechanism is now conditioned properly for control of a cooling medium inasmuch as expansion of the motor vessel constituted by chamber 51 will move the valve member 56 away from port 54, while contraction of the motor vessel 51 will cause valve member 56 to move toward port 54. The cooling medium in chamber 68 may therefore flow through wide open port 67, chamber 64, port 54, chamber 60 and outlet 61 under the control of the seating surface 57 in cooperative relationship with the port 54.

Whether valve member 56 is thereby conditioned for cooperation with the port 67 or the port 54, variations of temperature at the bulb 82 will cause expansion or contraction of the motor vessel 51 to move the active seating surface on valve member 56 with respect to the port then in cooperative relationship therewith for the purpose of adjusting the flow of medium to the heat interchanging surfaces in conformity with the temperature conditions to which the bulb 82 is subjected. This control is independent of any variations in pressure that may exist in the medium to be controlled, whether heating medium or cooling medium, because the bellows 52 and 72, subjected to said medium in chambers 60 and 68, have the same effective area and act in opposition on the composite valve stem 55, 70 so that the pressure of the medium to be controlled acts equally and in opposite directions on the valve member 56. Similarly, the valve ports 54 and 67 are of equal effective area, as are also the seating surfaces 57 and 58. Hence the pressure of the medium to be controlled applies balanced forces throughout so as to avoid changes in the operation of the regulator due to different or fluctuating pressures in said medium.

When the valve is conditioned for controlling a heating medium by disposition of its seating surface 58 in cooperative relationship with the port 67, seating surface 57 can never seat at the port 54 to stop the flow of heating medium because of any low temperature existing at bulb 82, because the movable end wall 49 will engage the stop surface 47 on post 46 before the volume of chambers 40 and 41 changes sufficiently so that the seating surface 57 can reach port 54. Similarly, when a cooling medium is being controlled valve member 56 can never close port 67 under any high temperature conditions existing at bulb 82, because movable end wall 49 will engage partition 42 before the surface 58 can be brought into position for closing port 67.

The temperature to be maintained in the space to which the bulb 82 is subjected may be predeterminately adjusted by manipulation of knob 97 to move the cup-shaped member 104 through the operation of the threaded plug 99 and the post 100. During such adjustment the spring 110 operating between the seats 105 and 109 causes the cylinder 108 and the end member 106 to move with the member 105, to which cup-shaped member 104 is attached, as a unit, the bellows 112 expanding or contracting to vary the volume of the chamber 107. Depending upon whether the end member 106 is moved toward or away from the end of post 114, the fluid with which the system is charged is forced out of the chamber 107 into the motor vessel 51 or withdrawn into chamber 107 from the motor vessel 51, respectively causing the motor vessel 51 to expand or contract. When a heating medium is being controlled, expansion of vessel 51 moves valve member 56 toward port 67 so that a lower rise of temperature at the bulb 82 will effect the closing of the port 67, while contraction of vessel 51 moves the valve member 56 farther away from the port 67 so that a higher temperature is required at the bulb 82 to effect the closure of the port 67. When a cooling medium is being controlled expansion or contraction of vessel 51, respectively, causes the valve member 56 to move farther away from or closer to its port 54 so that a lower or a higher temperature at the bulb 82 is required, respectively, to effect the closure of the port 54.

If under any condition of operation the temperature of the thermostatic fluid continues to increase after the valve member 56 has become seated, a further increase of pressure in the chamber 107 will cause end member 106 to move away from flange member 105 against the tension of the spring 110, with a corresponding contraction of the bellows 112, so that a pressure cannot develop in the motor vessel 51 sufficient to cause injury to the bellows 48.

The threaded spindle 77 constitutes an overriding control that can be manually manipulated to move valve member 56 into a position preventing flow of the heating or cooling fluid irrespective of temperature conditions, flange 78' on spindle 77 being so located that it will not engage the outer face of member 76 in a way that will interfere with the hereinbefore described automatic operation when spindle 77 is backed off so as to render the overriding control ineffective.

It will therefore be perceived that by the present invention a single thermostatically operated valve has been provided for automatically controlling the flow of either a heating fluid or a cooling fluid, depending upon what character of fluid is introduced into the conduit communicating with the regulator inlet 18, whereby a desired temperature condition or range of temperatures may be accurately maintained in the space whose temperature is to be controlled by utilizing the same valve member to control a medium flowing in conformity with the variations in the temperature in said space and also to establish that relationship of the valve means to its ports which is proper for the particular medium whose flow is to be controlled. The regulating mechanism is certain and efficient in operation, balanced against fluctuations or variations in the pressure of the medium being controlled, readily adjustable to set the temperature condition or range of temperatures to be maintained, and composed of parts which are inexpensive to fabricate and assemble.

While the embodiment of the invention illustrated on the drawing has been described with considerable particularity it is to be expressly understood that the invention is not limited thereto, as other embodiments of the invention will now readily suggest themselves to those skilled in the art, while changes may also be made in the details of construction, arrangement, proportion, size, etc., of the component parts, without departing from the spirit of this invention. Reference is therefore to be had to the claims hereto appended for a definition of said invention.

What is claimed is:

1. In a temperature regulator for automatically controlling the flow of either a heating medium or a cooling medium, in combination with a housing having an inlet and an outlet, valve means provided with a pair of seating surfaces, means provided with a pair of valve ports adapted to cooperate with said seating surfaces respectively, a thermostat subjected to the temperature of the medium flowing through said housing, fluid-pressure transmitting means operable by said thermostat and operatively connected to said valve means to move one or the other of said seating surfaces into cooperative relationship with one or the other of said valve ports depending upon whether said medium is hot or cold, and a second thermostat subjected to the medium to be controlled and operatively connected to said fluid-pressure transmitting means for operating said same valve means therethrough and adjusting the flow of medium between the operative seating surface thereon and the valve port with which it is positioned in cooperative relationship.

2. In a temperature regulator for automatically controlling the flow of either a heating medium or a cooling medium, in combination with a housing having an inlet and an outlet, valve means provided with a pair of seating surfaces, means provided with a pair of valve ports adapted to cooperate with said seating surfaces respectively, a thermostat subjected to the temperature of the medium flowing through said housing, fluid-pressure transmitting means operable by said thermostat and operatively connected to said valve means to move one or the other of said seating surfaces into cooperative relationship with one or the other of said valve ports depending upon whether said medium is hot or cold, and a second thermostat subjected to the medium to be controlled and operatively connected to said same valve means for adjusting the flow of medium between the operative surface thereon and the valve port with which it is positioned in cooperative relationship, said last named thermostat including an expansible and collapsible motor vessel operatively connected to said pressure transmitting means to apply pressure thereto.

3. In a temperature regulator for automatically controlling the flow of either a heating medium or a cooling medium, in combination with a housing having an inlet and an outlet, valve means provided with a pair of seating surfaces, means provided with a pair of valve ports adapted to cooperate with said seating surfaces respectively, a thermostat operatively connected to said valve means and subjected to the temperature of the medium flowing through said housing to move said valve means and position one or the other of said seating surfaces in cooperative relationship with one or the other of said valve ports depending upon whether said medium is hot or cold, a second thermostat subjected to the temperature to be controlled and operatively connected to said same valve means for adjusting the flow of medium between the operative seating surface thereon and the valve port with which it is positioned in cooperative relationship, said last named thermostat including an expansible and collapsible motor vessel subjected to the medium flowing through said casing, and a pressure responsive member subjected to the medium flowing through said housing and operatively connected to said valve means for balancing the pressure of said medium on said motor vessel.

4. In a temperature regulator for automatically controlling the flow of either a heating medium or a cooling medium, in combination with a housing having an inlet and an outlet, valve means provided with a pair of oppositely facing seating surfaces, means providing a chamber in which said valve means is disposed and having a pair of valve ports disposed at opposite sides of said valve means, a thermostat subjected to the temperature of the medium flowing through said housing, fluid-pressure transmitting means operable by said thermostat and operatively connected to said valve means, and a second thermostat subjected to the temperature to be controlled and operatively connected to said pressure transmitting means for operating said same valve means therethrough and varying the flow of medium through the valve port with which said valve means is positioned in cooperative relationship.

5. In a temperature regulator for automatically controlling the flow of either a heating medium or a cooling medium, in combination with a housing having an inlet and an outlet, valve means provided with a pair of oppositely facing seating surfaces, means providing a chamber in which said valve means is disposed and having a pair of valve ports disposed at opposite sides of said valve means, a thermostat subjected to the temperature of the medium flowing through said housing, fluid-pressure transmitting means operable by said thermostat and operatively connected to said valve means, and a second thermostat subjected to the temperature to be controlled and operatively connected to said same valve means for varying the flow of medium through the valve port with which said valve means is positioned in cooperative relationship, said last named thermostat including an expansible and collapsible motor vessel operatively connected to said pressure transmitting means to apply pressure thereto.

6. In a temperature regulator for automatically controlling the flow of either a heating medium or a cooling medium, in combination with a housing having an inlet and an outlet, valve means provided with a pair of oppositely facing seating surfaces, means providing a chamber in which said valve means is disposed and having a pair of valve ports disposed at opposite sides of said valve means, a thermostat operatively connected to said valve means for moving the same into cooperative relationship with one or the other of said valve ports, said thermostat being subjected to the temperature of the medium flowing through said housing, a second thermostat operatively connected to said same valve means and subjected to the temperature to be controlled for varying the flow of medium through the valve port with which said valve means is in cooperative relationship, said last named thermostat including an expansible and collapsible motor vessel subjected to the fluid flowing through said housing, and a pressure responsive member operatively connected to said valve means in opposition to said motor vessel and having the same effective area as said motor vessel for balancing the pressure of said medium on said motor vessel.

7. In a temperature regulator for automatically controlling the flow of either a heating medium or a cooling medium, in combination with a housing having an inlet and an outlet, a thermostat subjected to the medium flowing through said housing and having a movable end wall, means providing a pair of valve ports, valve means having a pair of seating surfaces for cooperation with the respective valve ports, a fluid-pressure transmitting means for transmitting the movement of the movable end wall of said thermostat to said valve means for positioning said valve means cooperatively with one or the other of said valve ports depending upon the temperature of the medium flowing through said housing, and a second thermostat subjected to the temperature of the medium to be controlled and including an expansible and collapsible motor vessel in pressure transmitting relationship to said fluid-pressure transmitting means for transmitting the movements of said motor vessel to said same valve means.

8. In a temperature regulator for automatically controlling the flow of either a heating medium or a cooling medium, in combination with a housing having an inlet and an outlet, a thermostat subjected to the medium flowing through said housing and having a movable end wall, means providing a pair of valve ports, valve means having a pair of seating surfaces for cooperation with the respective valve ports, a pair of expansible and collapsible vessels operatively associated with said thermostat and said valve means, a passage in communication with said vessels, said vessels and passage being filled with a pressure transmitting liquid to constitute a pressure transmitting system, said thermostat operating through said pressure transmitting system to position said valve means in cooperative relationship with one or the other of said ports depending upon the temperature of the fluid flowing through said housing, and a second thermostat subjected to the temperature to be controlled and including an expansible and collapsible motor vessel operatively connected to said same valve means for adjusting the flow of medium through the valve port with which it is in cooperative relationship by reason of the operation of said first thermostat.

9. In a temperature regulator for automatically controlling the flow of either a heating medium or a cooling medium, in combination with a housing having an inlet and an outlet, a thermostat subjected to the medium flowing through said housing and having a movable end wall, means providing a pair of valve ports, valve means having a pair of seating surfaces for cooperation with the respective valve ports, a pair of expansible and collapsible vessels operatively associated with said thermostat and said valve means, a passage in communication with said vessels, said vessels and passage being filled with a pressure transmitting liquid to constitute a pressure transmitting system, said thermostat operating through said pressure transmitting system to position said valve means in cooperative relationship with one or the other of said ports depending upon the temperature of the fluid flowing through said housing, and a second thermostat subjected to the temperature to be controlled and including an expansible and collapsible motor vessel in pressure transmitting relation to the liquid in said fluid pressure system and operatively connected to said same valve means for adjusting the flow of medium through the valve port with which it is in cooperative relationship by reason of the operation of said first thermostat.

10. In a temperature regulator for automatically controlling the flow of either a heating medium or a cooling medium, in combination with a housing having an inlet and an outlet, a thermostat subjected to the medium flowing through said housing and having a movable end wall, means providing a pair of valve ports, valve means having a pair of seating surfaces for cooperation with the respective valve ports, a pair of expansible and collapsible vessels operatively associated with said thermostat and said valve means, a passage in communication with said vessels, said vessels and passage being filled with a pressure transmitting liquid to constitute a pressure transmitting system, said thermostat operating through said pressure transmitting system to position said valve means in cooperative relationship with one or the other of said ports depending upon the temperature of the fluid flowing through said housing, a second thermostat subjected to the temperature to be controlled and including an expansible and collapsible motor vessel operatively connected to said same valve means for adjusting the flow of medium through the valve port with which it is in cooperative relationship by reason of the operation of said first thermostat, and means exteriorly of said housing and operatively connected to said motor vessel for expanding or contracting the same to move said valve means and predetermine the temperature at which it will open or close the valve port with which it is in cooperative relationship.

11. In a temperature regulator for automatically controlling the flow of either a heating medium or a cooling medium, in combination with a housing having an inlet and an outlet, a thermostat subjected to the medium flowing through said housing and having a movable end wall, means providing a pair of valve ports, valve means having a pair of cooperating seating surfaces for cooperation with the respective valve ports, a pair of expansible and collapsible vessels operatively associated with said thermostat and said valve means, a passage in communication with said vessels, said vessels and passage being filled with a pressure transmitting liquid to constitute a pressure transmitting system, said thermostat operating through said pressure transmitting system to position said valve means in cooperative relationship with one or the other of said ports depending upon the temperature of the fluid flowing through said housing, a second thermostat subjected to the temperature to be controlled and including an expansible and collapsible motor vessel operatively connected to the same valve means for adjusting the flow of medium through the valve port with which it is in cooperative relationship by reason of the operation of said first thermostat, said motor vessel being subjected to the medium flowing through said housing, and a second expansible and collapsible member operatively connected to said valve means in opposition to said motor vessel and having the same effective area as said motor vessel for balancing the pressure of said medium thereon.

12. In a temperature regulator for automatically controlling the flow of either a heating medium or a cooling medium, in combination with a housing having an inlet and an outlet, means in said housing providing a pair of valve ports, valve means having a pair of seating surfaces for cooperation with the respective ports, an expansible and collapsible chamber operatively connected to said valve means, a second expansible and collapsible chamber in communication with said first expansible and collapsible chamber, a third expansible and collapsible chamber in communication with said first and second expansible and collapsible chambers, said three expansible and collapsible chambers and the communications therebetween being filled with a fluid-pressure transmitting liquid, a thermostat in said housing subjected to the temperature of the medium flowing therethrough and operatively associated with said third expansible and collapsible chamber to transmit pressure to and from said first and second expansible and collapsible chambers, and a thermostat subjected to the temperature to be controlled and including a motor vessel operatively associated with said second expansible and collapsible chamber for actuating said valve means through the liquid in said first and second expansible and collapsible chambers.

CHARLES D. BRANSON.

REFERENCES CITED

The following references are of record in the file of this patent:

UNITED STATES PATENTS

| Number | Name | Date |
|---|---|---|
| Re. 22,685 | Carrier | Oct. 30, 1945 |
| 2,353,889 | Giesler | July 18, 1944 |